US00RE47705E

(19) United States
(12) Reissued Patent
Sakata

(10) Patent Number: US RE47,705 E
(45) Date of Reissued Patent: Nov. 5, 2019

(54) TOUCH SENSING DEVICE, TOUCH SENSING UNIT, STORAGE MEDIUM AND TOUCH SENSING METHOD

(71) Applicant: CASIO COMPUTER CO., LTD., Shibuya-ku, Tokyo (JP)

(72) Inventor: Goro Sakata, Tokyo (JP)

(73) Assignee: CASIO COMPUTER CO., LTD., Tokyo (JP)

(21) Appl. No.: 15/199,300

(22) Filed: Jun. 30, 2016

Related U.S. Patent Documents

Reissue of:
(64) Patent No.: 8,766,081
Issued: Jul. 1, 2014
Appl. No.: 13/727,383
Filed: Dec. 26, 2012

(30) Foreign Application Priority Data

Mar. 19, 2012 (JP) ..... 2012-061882

(51) Int. Cl.
*G10H 1/02* (2006.01)
*G10H 1/34* (2006.01)

(52) U.S. Cl.
CPC ..... *G10H 1/02* (2013.01); *G10H 1/344* (2013.01); *G10H 2220/271* (2013.01); *G10H 2220/281* (2013.01); *G10H 2220/285* (2013.01)

(58) Field of Classification Search
CPC ..... G10H 1/344
See application file for complete search history.

(56) References Cited

U.S. PATENT DOCUMENTS 4,668,843 A * 5/1987 Watanabe et al. ..... 200/5 A
5,062,342 A * 11/1991 Nagatsuma ..... 84/744
5,629,490 A 5/1997 Inaba
5,883,327 A 3/1999 Terada et al.
(Continued)

FOREIGN PATENT DOCUMENTS

DE 4497279 C2 3/2002
EP 1507254 A1 * 2/2005 ..... G10H 1/344
(Continued)

OTHER PUBLICATIONS

Japanese Office Action dated Feb. 25, 2014 issued in counterpart Japanese Application No. 2012-061882.
(Continued)

*Primary Examiner* — Cameron Saadat
(74) *Attorney, Agent, or Firm* — Holtz, Holtz & Volek PC

(57) ABSTRACT

A first contact and a second contact are provided at each of a plurality of keys, and are successively closed in accordance with a key press operation. On the basis of respective closed sense signals from the first contact and the second contact, a duration from when the first contact is closed until the second contact is closed is counted as a first count value and then a duration after this counting has ended is counted as a second count value. An attainment duration value and the second count value are compared, and when a predetermined condition is satisfied, a control signal is outputted. When this control signal is received, sound emission information instructing an emission of a sound by a sound emission controller is sent. The sound emission information includes touch information based on the first count value.

32 Claims, 15 Drawing Sheets

(56) References Cited

U.S. PATENT DOCUMENTS

| | | | | |
|---|---|---|---|---|
| 6,849,796 | B2 * | 2/2005 | Yamaguchi | 84/720 |
| 7,619,157 | B2 * | 11/2009 | Hirota | 84/658 |
| 8,134,060 | B2 * | 3/2012 | Taniguchi | 84/423 |
| 8,481,841 | B2 * | 7/2013 | Shimoda | 84/744 |
| 2003/0131720 | A1 | 7/2003 | Sakurada et al. | |
| 2004/0173085 | A1 * | 9/2004 | Seow et al. | 84/744 |
| 2008/0257135 | A1 * | 10/2008 | Hirota | 84/658 |
| 2011/0239846 | A1 * | 10/2011 | Shimoda | 84/687 |

FOREIGN PATENT DOCUMENTS

| | | | |
|---|---|---|---|
| JP | 07092971 | A | 4/1995 |
| JP | 08234733 | A | 9/1996 |
| JP | 2011064728 | A | 3/2011 |

OTHER PUBLICATIONS

Extended European Search Report (EESR) dated Jan. 8, 2014 (in English) issued in counterpart European Application No. 12199493.3.

* cited by examiner

FIG. 3

| | | | | | | | | | | | | | | | | | | | | |
|---|---|---|---|---|---|---|---|---|---|---|---|---|---|---|---|---|---|---|---|---|
| 0 | EV | ST2 | ST1 | ST0 | VC7 | VC6 | VC5 | VC4 | VC3 | VC2 | VC1 | VC0 | TC7 | TC6 | TC5 | TC4 | TC3 | TC2 | TC1 | TC0 |
| 1 | EV | ST2 | ST1 | ST0 | VC7 | VC6 | VC5 | VC4 | VC3 | VC2 | VC1 | VC0 | TC7 | TC6 | TC5 | TC4 | TC3 | TC2 | TC1 | TC0 |
| | | | | | ..... | | | | | | | | | | | | | | | |
| 81 | EV | ST2 | ST1 | ST0 | VC7 | VC6 | VC5 | VC4 | VC3 | VC2 | VC1 | VC0 | TC7 | TC6 | TC5 | TC4 | TC3 | TC2 | TC1 | TC0 |
| 82 | EV | ST2 | ST1 | ST0 | VC7 | VC6 | VC5 | VC4 | VC3 | VC2 | VC1 | VC0 | TC7 | TC6 | TC5 | TC4 | TC3 | TC2 | TC1 | TC0 |
| 83 | EV | ST2 | ST1 | ST0 | VC7 | VC6 | VC5 | VC4 | VC3 | VC2 | VC1 | VC0 | TC7 | TC6 | TC5 | TC4 | TC3 | TC2 | TC1 | TC0 |
| 84 | EV | ST2 | ST1 | ST0 | VC7 | VC6 | VC5 | VC4 | VC3 | VC2 | VC1 | VC0 | TC7 | TC6 | TC5 | TC4 | TC3 | TC2 | TC1 | TC0 |
| 85 | EV | ST2 | ST1 | ST0 | VC7 | VC6 | VC5 | VC4 | VC3 | VC2 | VC1 | VC0 | TC7 | TC6 | TC5 | TC4 | TC3 | TC2 | TC1 | TC0 |
| 86 | EV | ST2 | ST1 | ST0 | VC7 | VC6 | VC5 | VC4 | VC3 | VC2 | VC1 | VC0 | TC7 | TC6 | TC5 | TC4 | TC3 | TC2 | TC1 | TC0 |
| 87 | EV | ST2 | ST1 | ST0 | VC7 | VC6 | VC5 | VC4 | VC3 | VC2 | VC1 | VC0 | TC7 | TC6 | TC5 | TC4 | TC3 | TC2 | TC1 | TC0 |
| | EV | ST | | | VC | | | | | | | | TC | | | | | | | |

TOUCH SENSING DEVICE, TOUCH SENSING UNIT, STORAGE MEDIUM AND TOUCH SENSING METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is based upon and claims the benefit of priority from the prior Japanese Patent Application No. 2012-61882, filed Mar. 19, 2012, and the entire contents of which are incorporated herein by reference.

BACKGROUND OF THE INVENTION

1. Field of the Invention

The present invention relates to a touch sensing device, a touch sensing unit, a storage medium and a touch sensing method.

2. Related Art

Heretofore, velocity information representing the strength or weakness of a sound to be played by an electronic musical instrument has been sensed, for example, as follows in an electronic piano. A first contact and a second contact are provided below each key of the electronic piano. The first contact and the second contact are closed subject to mutually different key press amounts. The electronic piano measures a time difference between the closing timings of the first contact and the second contact, and detects velocity information on the basis of the time difference.

Then the electronic piano immediately emits a sound from a sound source in accordance with the velocity information.

Thus, a sound emission start time in the electronic piano is just after the velocity information is detected, that is, substantially at the timing of closing of the second contact. The second contact is disposed some way to the upper side of a lower limit of the key. That is, a conventional electronic piano starts sound emission before a key is pressed to its lower limit.

FIG. 18 is a graph describing timings from when a key is pressed until a sound is emitted in a conventional electronic piano.

As shown in FIG. 18, because the conventional electronic piano starts sound emission processing when the second contact is closed, sound is emitted before the key is fully pressed to the lower limit.

Fundamentally, it is ideal if the sound emission timings of an electronic piano match the sound emission timings of an acoustic piano. When a key is pressed in an acoustic piano, this movement is transmitted to the action, the hammer moves, the head strikes the string, and vibrations of the string emit sound, via the bridge and soundboard of the piano. The relationship between key press amounts and sound emission in an acoustic piano can be adjusted but, as described above, is structurally complex. Consequently, because a conventional electronic piano that emits sound at the closing timing of a second contact and an acoustic piano have different structures, the respective sound emission timings are different.

Moreover, differences between the sound emission timings of an electronic piano and an acoustic piano vary depending on the pitches of the sounds that are emitted and the strengths of key presses.

In a conventional electronic piano, with regard to preventing an increase in weight of the piano, maintaining rapid playability with key return times, avoiding malfunctions that are caused by complex action structures, and the like, the weights of the keys in the stationary condition are lighter and the inertial moments of the keys when pressed are lower than in an acoustic piano. The weight of a key in the stationary condition provides a reaction force when a key press from the stationary condition is begun, and provides an influence on an extremely weak key press operation. The inertial moment of a key provides a reaction force during a key press operation, and provides an influence on a strong key press operation.

FIG. 19 is a graph describing the difference between sound emission timings in a conventional electronic piano and sound emission timings in an acoustic piano.

FIG. 19 shows the two sound emission timings when a key is pressed with the same strength on an electronic piano and on an acoustic piano.

As described above, the key of the electronic piano has a lighter weight than the key of the acoustic piano and the inertial moment of the key during the key press is lower. Therefore, even if pressed with the same strength as the key of the acoustic piano, the key of the electronic piano is pressed down more quickly. Consequently, the sound emission timing of the electronic piano is earlier than the desired sound emission timing of the acoustic piano.

Accordingly, Japanese Unexamined Patent Application, Publication No. H08-234733 discloses an electronic instrument in which sound emission instruction information is detected by time difference sound emission processing that is executed by a central processing unit (CPU), after which a duration until a note is actually generated is delayed by a duration based on pitch information, timbre information or the like of the sound to be emitted.

Japanese Unexamined Patent Application, Publication No. H07-92971 proposes an electronic piano that, using a table that relates velocities with delay durations, specifies a delay duration by sound emission timing correction processing executed by a CPU, and emits a sound after the delay duration has passed.

According to the electronic instrument of Japanese Unexamined Patent Application, Publication No. H08-234733 and the electronic piano of Japanese Unexamined Patent Application, Publication No. H07-92971, a duration from a key being pressed until a sound is emitted may be adjusted by a CPU executing processing in software.

However, recent electronic instruments generate many sounds at the same time, and the processing burden on embedded CPUs is increasing. As a consequence, accurately managing delay durations of sound emission timings simply by employing processing based on a CPU executing software as in Japanese Unexamined Patent Application, Publication No. H08-234733 and Japanese Unexamined Patent Application, Publication No, H07-92971 has become difficult.

FIG. 20 is a graph describing timings from when a key is pressed until a sound is emitted in a conventional electronic piano in which a sound emission timing is delayed by processing in software.

The conventional electronic piano that delays the sound emission timing by processing in software counts a correction duration for delaying the sound emission timing from when the second contact is closed, and emits the sound after the correction duration has passed.

However, the processing burden on the CPU of this electronic piano varies depending on the number of sounds to be emitted at the same time. Consequently, as shown in FIG. 20, there is inconsistency in the counting of correction durations depending on the variations in the processing burden on the CPU. As a result, there is inconsistency in sound emission timings. Because this inconsistency changes in accordance with variations in the processing burden on the CPU, a player may not be able to adapt to the inconsistency, which is a hindrance to playing.

SUMMARY OF THE INVENTION

The present invention has been devised in consideration of this situation, and an object of the present invention is for an electronic musical instrument to emit sounds with accurate timings for key presses of respective keys, even when many sounds are to be emitted at the same time.

In order to achieve the above object, a touch sensing device of an aspect of the present invention is provided with: a first contact and second contact provided at each of a plurality of keys, the first contact and second contact successively being closed in accordance with a key press operation; a reception section that receives closed sense signals from the first contact and the second contact; a first counter that, on the basis of the respective closed sense signals received from the first contact and the second contact, counts a first count value that indicates a duration from when the first contact is closed until the second contact is closed; a second counter that counts a second count value that indicates a duration after the counting of the first count value ends;

a comparator that compares the second count value with a pre-specified attainment duration value and, when a result of the comparison satisfies a predetermined condition, outputs a control signal; and a controller that, when it receives the control signal from the comparator, sends sound emission information instructing an emission of sound by a sound emission controller, the sound emission information including touch information based on the first count value.

BRIEF DESCRIPTION OF THE DRAWINGS

FIG. 3 is a diagram describing the format of a counter memory of the touch sensing device of FIG. 2;

DETAILED DESCRIPTION OF THE PREFERRED EMBODIMENT

Herebelow, a touch sensing device according to an embodiment of the present invention is described in accordance with the attached drawings.

Figure 1:
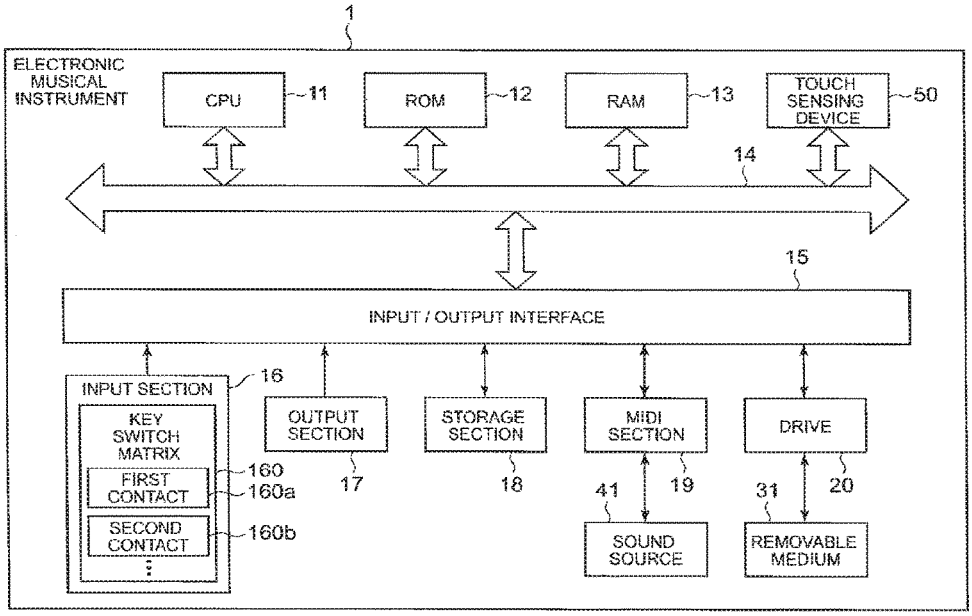
FIG. 1 is a block diagram showing hardware structures of an electronic musical instrument in which a touch sensing device in accordance with an embodiment of the present invention is employed.

FIG. 1 is a block diagram showing hardware structures of an electronic musical instrument 1 that employs a touch sensing device 50 according to the embodiment of the present invention.

In FIG. 1, the electronic musical instrument 1 is provided with a CPU 11, a read-only memory (ROM) 12, a random access memory (RAM) 13, a bus 14, an input/output interface 15, an input section 16, an output section 17, a storage section 18, a Musical Instrument Digital Interface (MIDI) section 19, a drive 20 and the touch sensing device 50.

The CPU 11 executes various processes in accordance with a program stored in the ROM 12 or a program loaded into the RAM 13 from the storage section 18. For example, the CPU 11 executes control for emitting sounds on the basis of sound emission information (which is described in more detail below) sent from the touch sensing device 50. That is, the CPU 11 executes sound emission control.

Data and suchlike that is required for execution of the various processes by the CPU 11 is stored in the RAM 13 as appropriate.

The CPU 11, the ROM 12, the RAM 13 and the touch sensing device 50, which is described below, are connected to one another via the bus 14. The input/output interface 15 is also connected to the bus 14. The input section 16, the output section 17, the storage section 18, the MIDI section 19 and the drive 20 are connected to the input/output interface 15.

The input section 16 includes a MIDI keyboard with a plural number of keys (for example, 88 keys) that are respectively associated with different types of sound. In the electronic musical instrument 1, the different types of sound associated with the plural keys are identified by note numbers. Key press and release operations of these keys are sensed by the below-described touch sensing device 50.

Specifically, the input section 16 is provided with a key switch matrix 160 in which, for each of the plural keys, first contact 160a and a second contact 160b are connected in a matrix. The first contact 160a and second contact 160b are successively closed in association with a key press operation.

In response to common side switch input signals (KC) sent from the touch sensing device 50, the key switch matrix 160 senses that one of the first contact 160a and the second contact 160b has closed. The key switch matrix 160 then sends a first contact closed signal indicating that the first contact 160a has closed or a second contact closed signal indicating that the second contact 160b has closed to the touch sensing device 50.

Conversely, in accordance with a key release operation from a state in which the key is pressed, the key switch matrix 160 senses the second contact 160b and the first contact 160a being successively opened. The key switch matrix 160 sends a first contact opened signal indicating that the first contact 160a has opened or a second contact opened signal indicating that the second contact 160b has opened to the touch sensing device 50.

The input section 16 is also equipped with switches for inputting various kinds of information. The input section 16 outputs the various kinds of information inputted by a user to the CPU 11.

The output section 17 includes a display, a speaker, a digital-to-analog (D/A) conversion circuit, and the like. The output section 17 outputs images and sounds or the like.

The storage section 18 is structured with a hard disc, a dynamic random access memory (DRAM) or the like, and stores various programs for control of the electronic musical instrument 1.

The MIDI section 19 is an interface that connects the CPU 11 serving as a sound emission controller with a sound source 41 that generates musical sounds. The sound source 41 stores sound source data in which the plural kinds of sound respectively associated with the plural keys of the input section 16 are related with note numbers. In accordance with control by the CPU 11, the sound source 41 reads the sound source data and outputs musical sounds.

A removable medium 31 formed with a magnetic disk, an optical disk, a magneto-optical disk, a semiconductor memory, or the like is installed in the drive 20, as appropriate. As required, a program read from the removable medium 31 by the drive 20 is installed in the storage section 18. Similarly to the storage section 18, the removable medium 31 may also store the various kinds of data that are stored in the storage section 18.

Next, hardware structures of the touch sensing device 50 according to the present embodiment are described with reference to FIG. 2.

Figure 2:
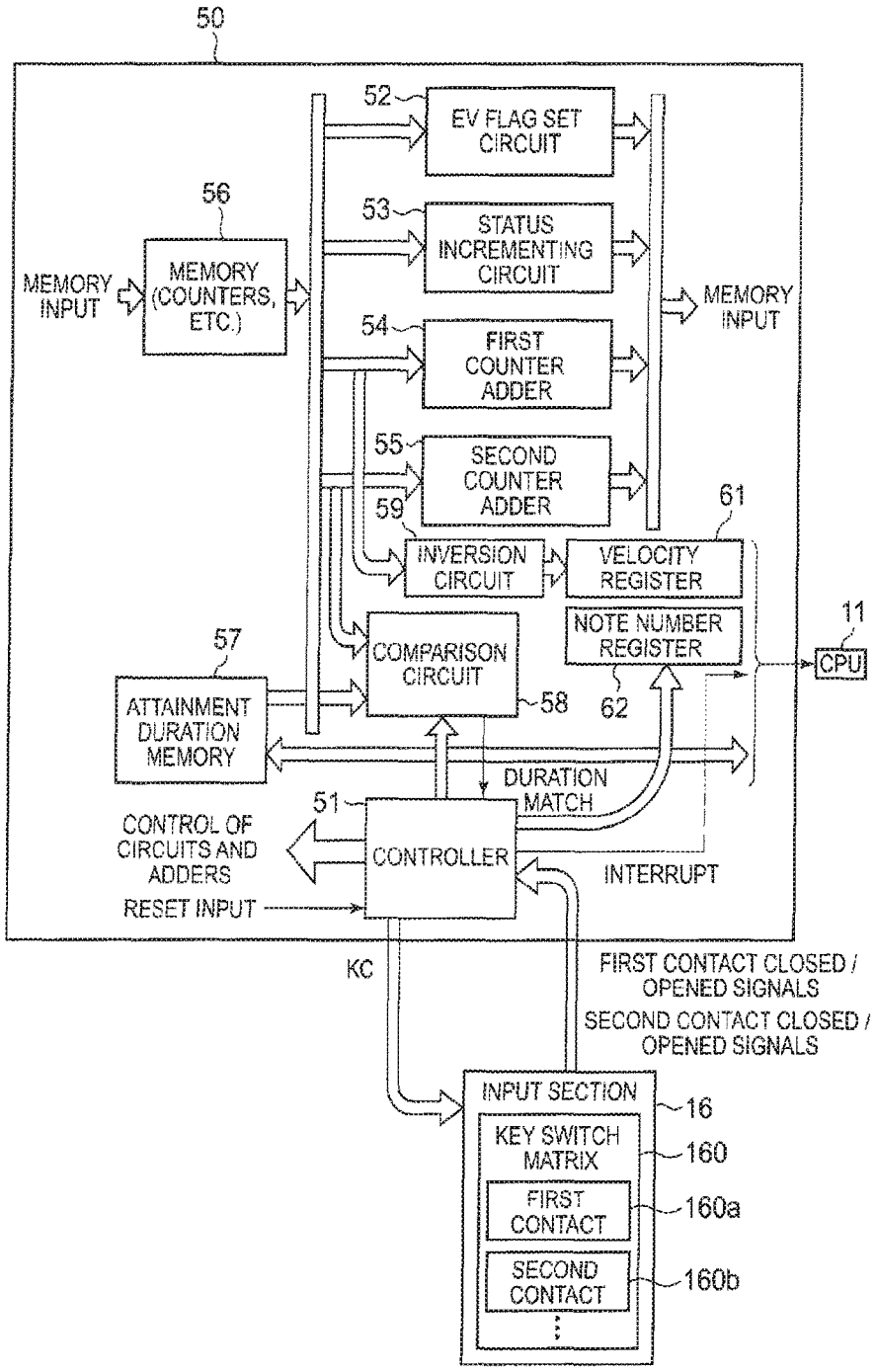
FIG. 2 is a block diagram showing hardware structures of the touch sensing device in accordance with the embodiment of the present invention.

FIG. 2 is a block diagram showing the hardware structures of the touch sensing device 50 according to the embodiment of the present invention.

The touch sensing device 50 is provided with a controller 51 that serves as a control circuit, an event flag set circuit 52 (which may be referred to hereinafter as "the EV flag set circuit 52"), a status incrementing circuit 53, a first counter adder 54, a second counter adder 55, a counter memory 56, an attainment duration memory 57, a comparison circuit 58, an inversion circuit 59, a velocity register 61 and a note number register 62.

The controller 51 is connected with the first contacts 160a and second contacts 160b of the key switch matrix 160 and receives the first contact closed signals and second contact closed signals.

The controller 51 controls other hardware in the touch sensing device 50, generates sound emission information when sound emission is prompted by the CPU 11 acting as the sound emission controller, and sends the sound emission information to the sound emission controller via the bus 14.

In the present embodiment, this sound emission information includes information that interrupts processing at the CPU 11, the note number of the key when a key of the input section 16 has been pressed, and a velocity value that is touch information representing the strength of pressing of the key.

When the CPU 11 acting as the sound emission controller receives sound emission information, the CPU 11 operates in conjunction with the sound source 41 and implements control of the emission of the sound associated with the note number included in the sound emission information at a strength corresponding to the velocity.

The controller 51 sends the common side switch input signals (KC) to the key switch matrix 160 and receives first contact closed signals and second contact closed signals from the key switch matrix 160.

The controller 51 controls the aforementioned circuits and adders constituting the touch sensing device 50 in accordance with event flags (which may be referred to hereinafter as "EV") and status flags (which may be referred to hereinafter as "ST").

In the present embodiment, the value of EV can be "zero" or "one".

When the value of EV is "zero", this represents a state in which none of the keys is being pressed or released.

When the value of EV is "one", this represents a state in which-any of the keys is being pressed or released.

In the present embodiment, the value of ST can be "zero", "one", "two", "three" or "four".

When the value of ST is "zero", this represents a status of waiting for a key press.

When the value of ST is "one", this represents a status during counting of a bias duration, which is described below.

When the value of ST is "two", this represents a status during counting of a velocity measurement value, which is described below.

When the value of ST is "three", this represents a status during counting of a correction duration count value, which is described below.

When the value of ST is "four", this represents a status of waiting for a key release.

The controller 51 stores the values of EV and ST in the counter memory 56, refers to the values as appropriate, and controls and updates the EV flag set circuit 52 and the status incrementing circuit 53.

FIG. 3 is a diagram describing the format of the counter memory 56 according to the present embodiment.

The counter memory 56 contains plural addresses respectively corresponding to the plural keys. Specifically, in the present embodiment, the counter memory 56 contains 88 addresses respectively corresponding to the 88 keys. At each address, for the related key, a value of EV, a value of ST, a velocity count value serving as a first count value, and a correction duration count value serving as a second count value are stored. As described in more detail below, the velocity count value (which may be referred to hereinafter as "VC") is counted up by the first counter adder 54, and the correction duration count value (which may be referred to hereinafter as "TC") is counted up by the second counter adder 55.

The note number (not shown in the drawing) related with the key is also stored at each address.

The EV flag set circuit 52 updates each value of EV stored in the counter memory 56 in accordance with control by the controller 51.

The status incrementing circuit 53 updates the value of ST stored in the counter memory 56 in accordance with control by the controller 51.

In accordance with control by the controller 51, the first counter adder 54 counts up a duration from when the first contact 160a is closed until the second contact 160b is closed at VC in the counter memory 56. In accordance with control by the controller 51, the first counter adder 54 also resets VC in the counter memory 56.

When the value of ST is "one", VC in the counter memory 56 represents a bias duration, and when the value of ST is "two", VC in the counter memory 56 represents a velocity measurement value. That is, the velocity measurement value is a value representing a duration from when the first contact 160a is closed until the second contact 160b is closed excluding the bias duration, which is specified in advance.

In accordance with control by the controller 51, the second counter adder 55 counts up a duration from when the adding by the first counter adder 54 ends, at TC in the counter memory 56. In accordance with control by the controller 51, the second counter adder 55 also resets TO in the counter memory 56.

The attainment duration memory 57 stores attainment duration values representing pre-specified durations for completion of counting by the second counter adder 55, in accordance with velocity measurement values of VC.

The comparison circuit 58 compares an attainment duration value stored in the attainment duration memory 57 with TC. When the attainment duration value and TC match, the comparison circuit 58 sends a match signal to the controller 51.

The inversion circuit 59 reads the VC (velocity measurement value) stored in the counter memory 56, calculates a velocity value by inversion processing, and saves the velocity value in the velocity register 61.

Next, operation timings of the hardware structuring the touch sensing device 50 according to the present embodiment are described with reference to FIG. 4.

Figure 4:
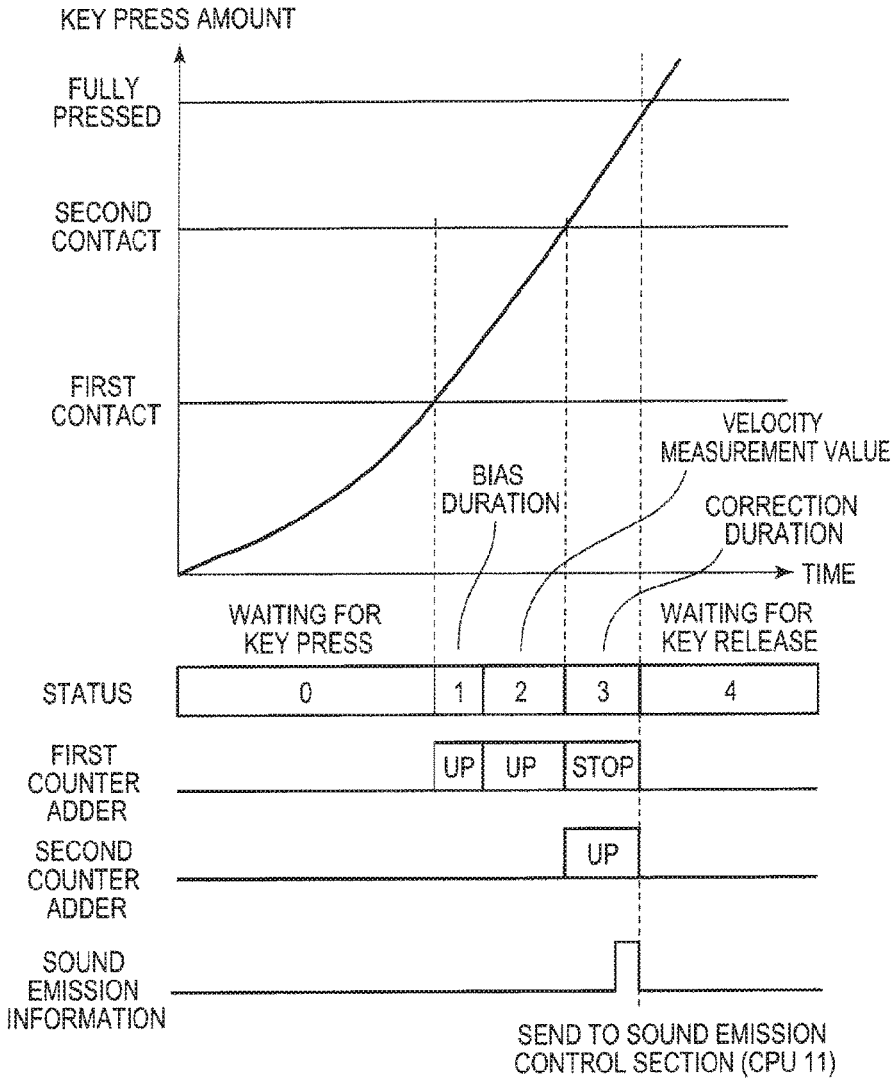
FIG. 4 is a graph describing operation timings of the touch sensing device of FIG. 2.

FIG. 4 is a graph describing the operation timings of the hardware structuring the touch sensing device 50 according to the present embodiment.

First, at the bottom left of the graph shown in FIG. 4, a key press operation of a key is started by a player. At this time, the value of EV stored in the counter memory 56 is "zero".

When the key is pressed further and the first contact 160a is closed, the key switch matrix 160 sends the first contact closed signal to the controller 51.

When the controller 51 receives the first contact closed signal, the controller 51 specifies the key for which the first contact closed signal has been sent, and implements control to update the different values stored in the counter memory 56 at the address of the specified key (see FIG. 3). The controller 51 also saves the note number of the specified key in the note number register 62.

Further, when the controller 51 receives the first contact closed signal, the controller 51 sets the value of EV at the EV flag set circuit 52 to "one", sets the value of ST at the status incrementing circuit 53 to "one", and resets VC at the first counter adder 54. Then the controller 51 starts counting and counts up VC. VC in the counter memory 56 at this time represents the bias duration.

Then, when the value of VC in the counter memory 56 reaches the predetermined value specified in advance as the bias duration, the controller 51 sets the value of ST at the status incrementing circuit 53 to "two", and resets VC at the first counter adder 54. Then the controller 51 starts counting and counts up VC. VC at this time represents the velocity measurement value.

When the key is pressed further and the second contact 160b is closed, the key switch matrix 160 sends the second contact closed signal to the controller 51.

When the controller 51 receives the second contact closed signal, the controller 51 sets the value of ST at the status incrementing circuit 53 to "three", ends the counting of VC at the first counter adder 54, and resets TC at the second counter adder 55. Then the controller 51 starts counting and counts up TC. TC at this time re resents the correction duration.

At this time, the inversion circuit 59 reads the value of VC (the velocity measurement value) stored in the counter memory 56, calculates a velocity value by inversion processing, and saves the velocity value to the velocity register 61. The controller 51 generates the sound emission information, including the interrupt signal, the note number saved in the note number register 62 and the velocity value saved in the velocity register 61.

Subsequently, the comparison circuit 58 compares the pre-specified attainment duration value stored in the attainment duration memory 57 with TO, and when TO matches the attainment duration value, sends a match signal to the controller 51. When the controller 51 receives the match signal, the controller 51 sends the sound emission information including the velocity value to the CPU 11 acting as the sound emission controller.

The CPU 11 executes sound emission processing that emits a sound on the basis of the sound emission information sent from the controller 51.

The above-described sequence of processing executed by the touch sensing device 50 is referred to hereinafter as "the touch sensing operation processing".

Figure 5:
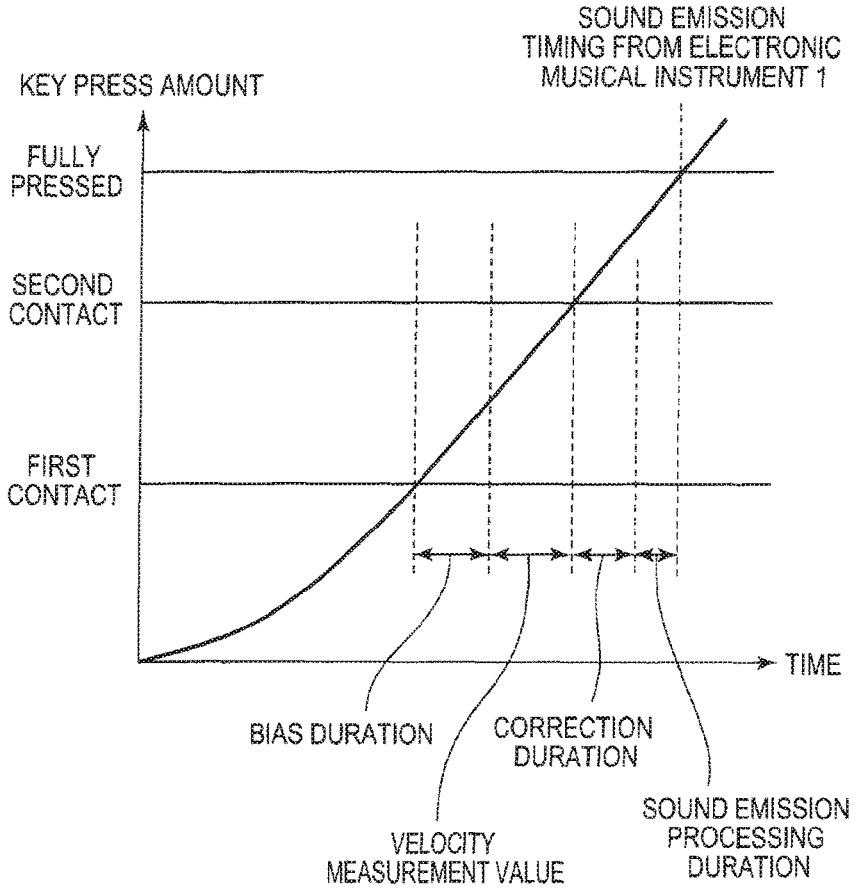
FIG. 5 is a graph describing timings from when a key is pressed until a sound is emitted in a case in which touch sensing operation processing is executed by the touch sensing device of FIG. 2.

FIG. 5 is a graph describing timings from when a key is pressed until a sound is emitted when the touch sensing operation processing is executed by the touch sensing device 50 according to the embodiment of the present invention.

The hardware of the touch sensing device 30 operates at the timings shown in FIG. 4, and the electronic musical instrument 1 emits a sound when shown in FIG. 5. More specifically, when a key is pressed and the first contact 160a is closed, the bias duration is counted up, and then the velocity measurement value is counted up. Then, when the key is pressed further and the second contact 160b is closed, the correction duration corresponding to the velocity measurement value is counted up, and after the correction duration has passed, the sound emission processing is executed at the sound emission controller. Thus, a sound is emitted at a timing when the key is fully pressed.

Next, the touch sensing operation processing of the hardware structuring the touch sensing device 50 according to the present embodiment is described with reference to FIG. 6 to FIG. 10.

FIG. 6 to FIG. 10 are flowcharts describing the flow of the touch sensing operation processing of the touch sensing device 50 according to the present embodiment.

Figure 6:
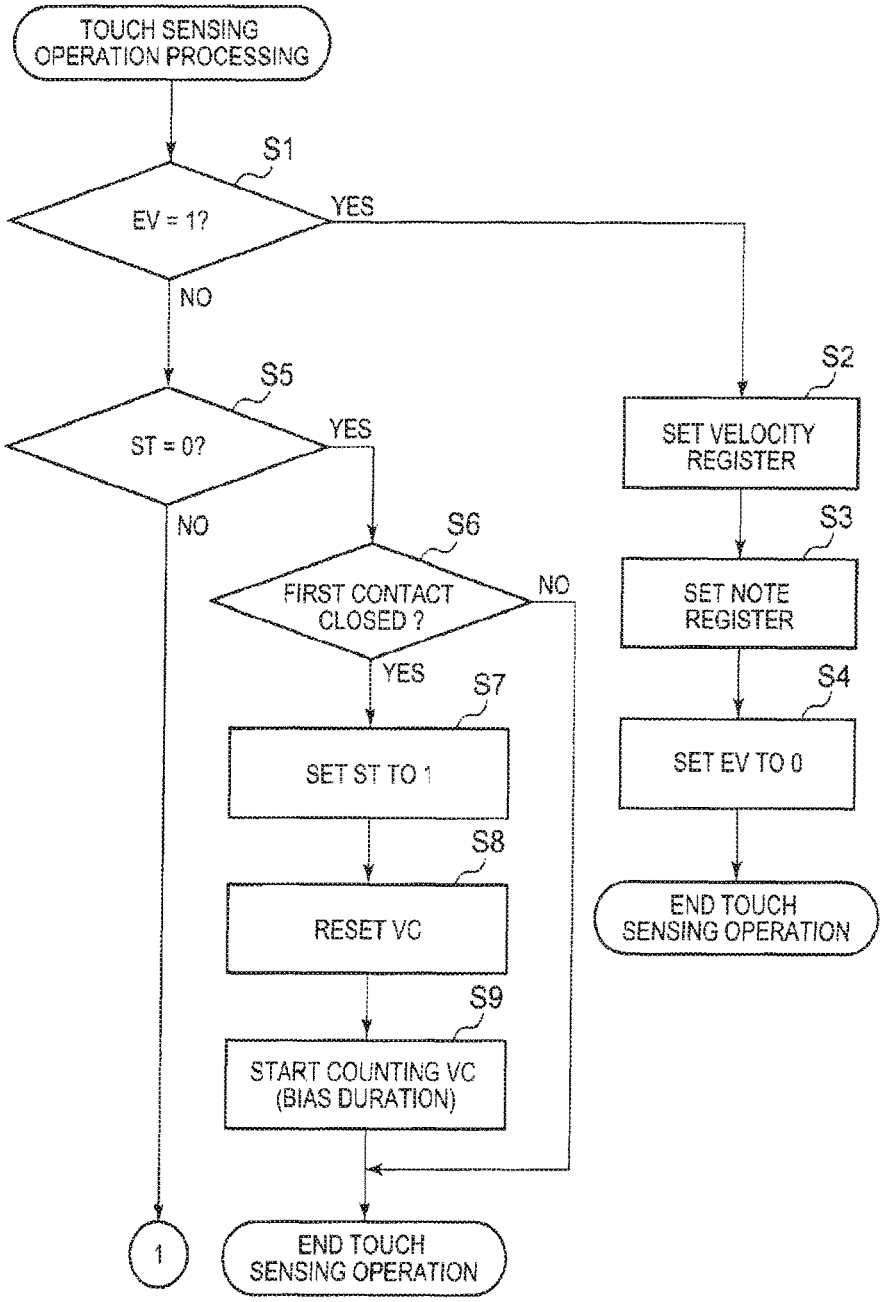
FIG. 6 is a flowchart describing the flow of the touch sensing operation processing executed by the touch sensing device of FIG. 2.

As shown in FIG. 6, in step S1, the controller 51 makes a determination as to whether the value of EV in the counter memory 56 is "one". If it is determined that the value of EV is "one", the processing advances to step S2, and if it is determined that the value of EV is not "one", the processing advances to step S5.

In step S2, the inversion circuit 59 reads the value of VC (the velocity measurement value) stored at the counter memory 56, calculates the velocity value by inversion processing, and saves the velocity value to the velocity register 61.

In step S3, the controller 51 saves the note number of the key for which the first contact closed signal or second contact closed signal has been received in the note number register 62.

In step S4, the EV flag set circuit 52 updates the value of EV stored in the counter memory 56 to "zero".

In step S5, the controller 51 makes a determination as to whether the value of ST in the counter memory 56 is "zero". If it is determined that the value of ST is "zero", the processing advances to step S6, and if it is determined that the value of ST is not "zero", the processing advances to step S10.

In step S6, the controller 51 makes a determination as to whether the first contact closed signal has been received. If it is determined that the first contact closed signal has been received, the processing advances to step S7, and if it is determined that the first contact closed signal has not been received, the touch sensing operation is ended.

In step S7, the status incrementing circuit 53 updates the value of ST stored in the counter memory 56 to "one".

In step S8, the first counter adder 54 resets VC in the counter memory 56.

In step S9, the first counter adder 54 starts counting up VC at the counter memory 56 (for the bias duration).

Figure 7:
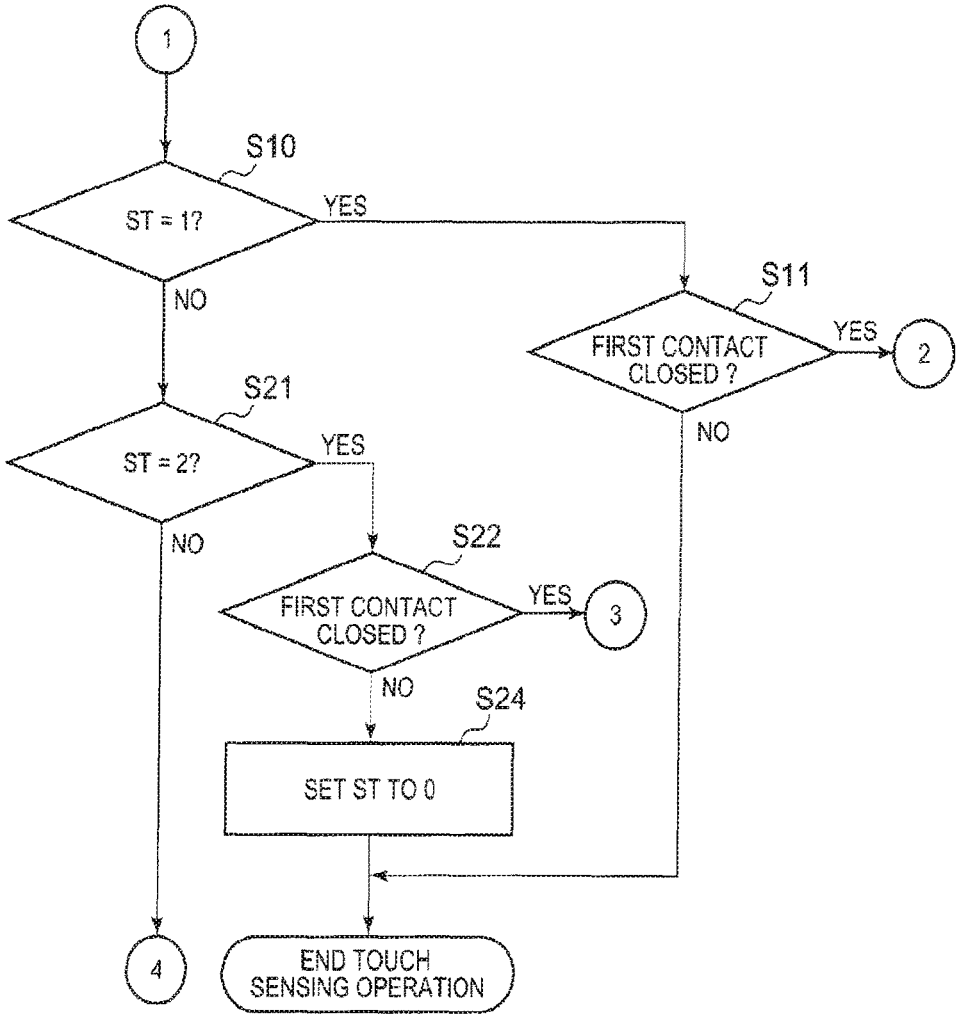
FIG. 7 is a flowchart describing the flow of the touch sensing operation processing executed by the touch sensing device of FIG. 2.

As shown in FIG. 7, in step S10, the controller 51 makes a determination as to whether the value of ST in the counter memory 56 is "one". If it is determined that the value of ST is "one", the processing advances to step S11, and if it is determined that the value of ST is not "one", the processing advances to step S21.

In step S11, the controller 51 makes a determination as to whether the first contact closed signal has been received. If it is determined that the first contact closed signal has been received, the processing advances to step S12, and if it is determined that the first contact closed signal has not been received, the touch sensing operation is ended.

Figure 8:
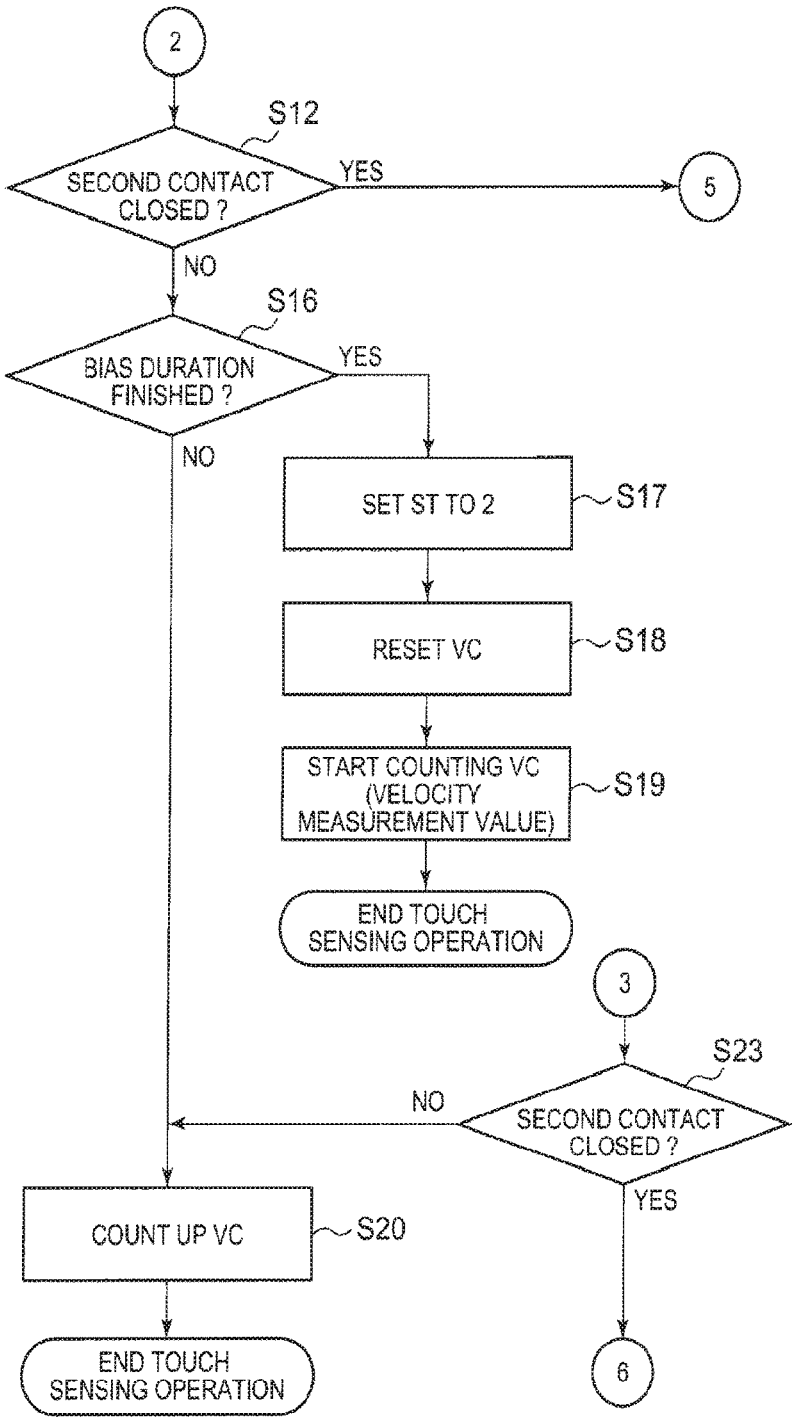
FIG. 8 is a flowchart describing the flow of the touch sensing operation processing executed by the touch sensing device of FIG. 2.

As shown in FIG. 8, in step S12 the controller 51 makes a determination as to whether the second contact closed signal has been received. If it is determined that the second contact closed signal has been received, the processing advances to step S13, and if it is determined that the first contact closed signal has not been received, the processing advances to step S16.

Figure 9:
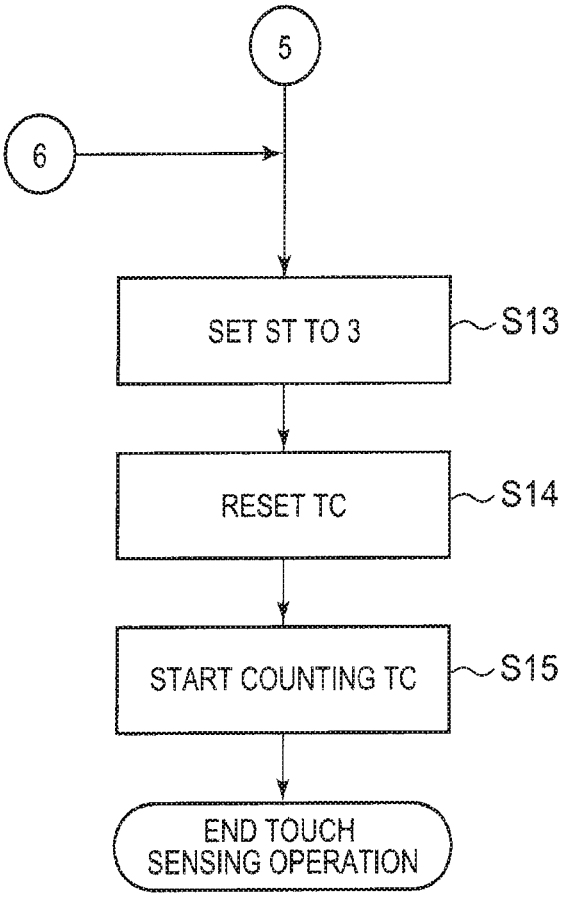
FIG. 9 is a flowchart describing the flow of the touch sensing operation processing executed by the touch sensing device of FIG. 2.

As shown in FIG. 9, in step S13 the status incrementing circuit 53 updates the value of ST stored in the counter memory 56 to "three".

In step S14, the second counter adder 55 resets TC in the counter memory 56.

In step S15, the second counter adder 55 starts counting up TC at the counter memory 56.

Returning to FIG. 8, in step S16 the controller 51 makes a determination as to whether VC in the counter memory 56 matches the pre-specified bias duration. If it is determined that they match, the processing advances to step S17, and if it is determined that they do not match, the processing advances to step S20.

In step S17, the status incrementing circuit 53 updates the value of ST stored in the counter memory 56 to "two".

In step S18, the first counter adder 54 resets VC in the counter memory 56.

In step S19, the first counter adder 54 starts to count up VC (the velocity measurement value) at the counter memory 56.

In step S20, the first counter adder 54 continues to count up VC at the counter memory 56.

Returning to FIG. 7, in step S21 the controller 51 makes a determination as to whether the value of ST in the counter memory 56 is "two". If it is determined that the value of ST is "two", the processing advances to step S22, and if it is determined that the value of ST is not "two", the processing advances to step S25.

In step S22, the controller 51 makes a determination as to whether the first contact closed signal has been received. If it is determined that the first contact closed signal has been received, the processing advances to step S23, and if it is determined that the first contact closed signal has not been received, the processing advances to step S24.

As shown in FIG. 8, in step S23 the controller 51 makes a determination as to whether the second contact closed signal has been received. If it is determined that the second contact closed signal has been received, the processing advances to step S13, and if it is determined that the first contact closed signal has not been received, the processing advances to step S20.

In step S24, the status incrementing circuit 53 updates the value of ST stored in the counter memory 56 to "zero".

Figure 10:
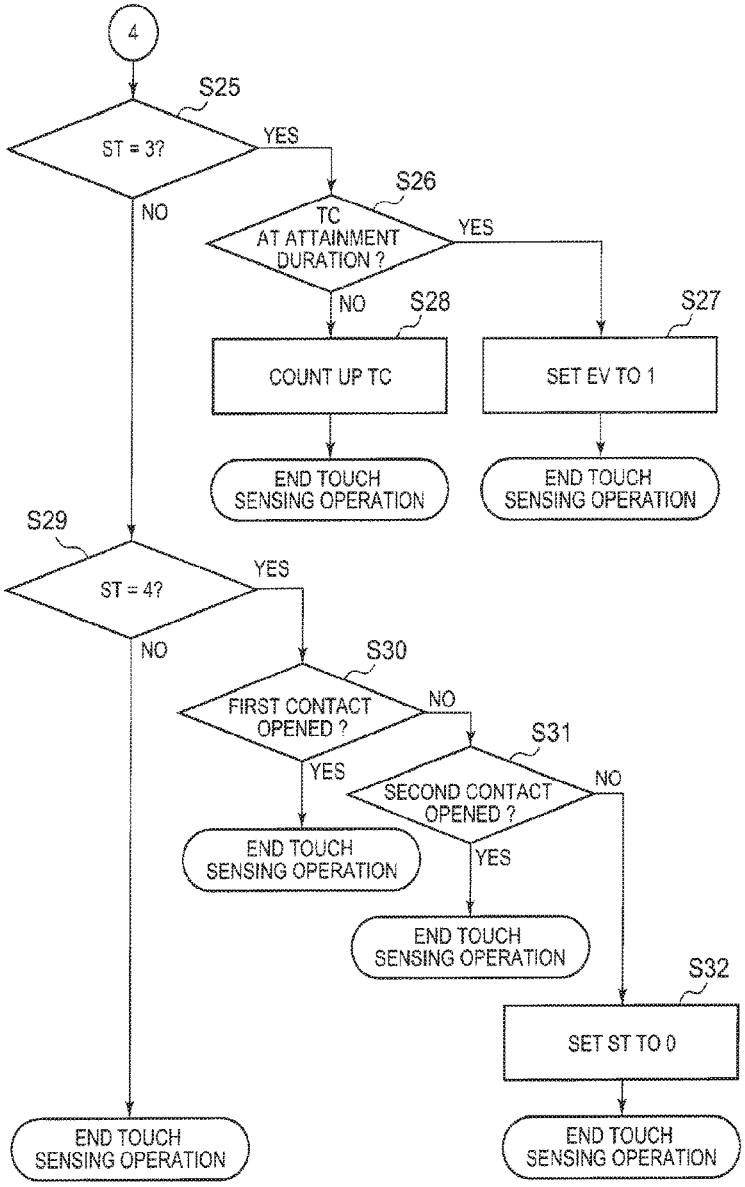
FIG. 10 is a flowchart describing the flow of the touch sensing operation processing executed by the touch sensing device of FIG. 2.

As shown in FIG. 10, in step S25 the controller 51 makes a determination as to whether the value of ST in the counter memory 56 is "three". If it is determined that the value of ST is "three", the processing advances to step S26, and if it is determined that the value of ST is riot "three", the processing advances to step S29.

In step S26, the comparison circuit 58 compares an attainment duration value stored in the attainment duration memory 57 with the value of TC in the counter memory 56. If it is determined that the attainment duration value and TO match, and a match is determined, the processing advances to step S27, and if it is determined that they do not match, the processing advances to step S28.

In step S27, the EV flag set circuit 52 updates the value of EV stored in the counter memory 56 to "one".

In step S28, the second counter adder 55 continues to count up TO at the counter memory 56.

In step S29, the controller 51 makes a determination as to whether the value of ST in the counter memory 56 is "four". If it is determined that the value of ST is "four", the processing advances to step S30, and if it is determined that the value of ST is not "four", the touch sensing operation is ended.

In step S30, the controller 51 makes a determination as to whether the first contact opened signal has been received. If it is determined that the first contact opened signal has been received, the touch sensing operation is ended, and if it is determined that the first contact opened signal has not been received, the processing advances to step S31.

In step S31, the controller 51 makes a determination as to whether the second contact opened signal has been received. If it is determined that the second contact opened signal has been received, the touch sensing operation is ended, and if it determined that the second contact opened signal has not been received, the processing advances to step S32.

In step S32, the status incrementing circuit 53 updates the value of ST stored in the counter memory 56 to "zero".

As described hereabove, the present embodiment of the touch sensing device 50 is equipped with the controller 5 the first contacts 160a and second contacts 160b, the first counter adder 54, the second counter adder 55, the counter memory 56, the attainment duration memory 57 and the comparison circuit 58.

The controller 51 is connected with the first contacts 160a and second contacts 160b of the key switch matrix 160 and receives first contact closed signals and second contact closed signals.

The first contact 160a and second contact 160b are provided at each of the plural keys, and are successively closed in accordance with a key press operation.

The first counter adder 54 counts up VC at the counter memory 56 in a duration from when the first contact 160a is closed until the second contact 160b is closed.

The second counter adder 55 counts up CC at the counter memory 56 in the period after counting up by the first counter adder 54 has ended.

The counter memory 56 contains addresses respectively corresponding to the plural keys. At each address, the velocity count value serving as the first count value for the related key and the correction duration count value serving as the second count value for the related key are stored.

The comparison circuit 58 compares an, attainment duration value stored in the attainment duration memory 57 with TC. When the attainment duration value and TO match, the comparison circuit 58 sends a match signal to the controller 51.

When the controller 51 receives the match signal, the controller 51 sends sound emission information including a velocity value to the CPU 11 acting as the sound emission controller.

Thus, a velocity measurement value for calculating the velocity value is counted by the first counter adder 54, and a correction duration for matching up the sound emission timing with a timing at which the key is fully pressed is counted by the second counter adder 55. After the correction duration has passed, the sound emission information including the velocity value is sent by the controller 51 to the CPU 11 acting as the sound emission controller.

Therefore, the touch sensing device 50 that is provided separately from the CPU 11 serving as the sound emission controller may send the sound emission information containing the velocity value to the CPU 11 serving as the sound emission controller with an accurate timing.

Therefore, the processing load of measuring velocity values, counting durations for matching up sound emission timings with key press operations and the like is not imposed on the CPU 11 serving as the sound emission controller.

Thus, in an electronic musical instrument, even when many sounds are being generated at the same time, the sounds may be emitted with accurate timings according to presses of the keys.

Moreover, because the touch sensing device 50 is provided separately from the sound emission controller (the CPU 11), the CPU 11 or the like serving as the sound emission controller may be used in the same manner as in the related art, and work, costs and the like related to development may be reduced. Because the velocity count value and correction duration count value are stored in the counter memory 56, a number of components that include memory may be kept down compared to a case in which these values are stored in respectively separate memories.

The attainment duration memory 57 stores the pre-specified attainment duration values representing a duration for completion of counting by the second counter adder 55 in accordance with velocity measurement values of VC, and the comparison circuit 58 compares an attainment duration value stored in the attainment duration memory 57 with TC.

Therefore, correction durations before sounds are emitted may be adjusted by over-writing the attainment duration values stored in the attainment duration memory. This, changes in the correction durations may be suitably made in accordance with the preferences of users, timbres and the like.

Next, a first application example, a second application example and a third application example, which are application examples of the present embodiment, are described. Herebelow, the application examples of the present embodiment are described; structural elements that are the same as in the present embodiment are assigned the same reference numerals and descriptions thereof are omitted or simplified.

Electronic musical instruments of the first application example, the second application example and the third application example are each equipped with a touch sensing unit including two of the touch sensing device 50 of the present embodiment. Specifically, each touch sensing unit of the first application example, the second application example and the third application example is provided with a first touch sensing device 50A and a second touch sensing device 50B. Thus, signals from up to four contact points may be processed in accordance with each key press operation. The first touch sensing device 50A and the second touch sensing device 50B are provided with the same hardware structures as the touch sensing device 50 of the present embodiment.

Firstly, the first application example is described.

An electronic musical instrument 1A of the first application example features a damper function that prolongs sound emission durations. When the electronic musical instrument 1A turns off this damper function (which may be referred to hereinafter as "damper-off"), the electronic musical instrument 1A continues sound emissions without decaying the sounds even if the keys are rapidly played. When the electronic musical instrument 1A turns on the damper function (which may be referred to hereinafter as "damper-on"), all sounds decay.

The key switch matrix of the electronic musical instrument 1A includes a third contact in addition to the first contacts and second contacts. The electronic musical instrument 1A turns the damper off when the third contact is closed, and turns the damper on when the third contact is opened.

Figure 11:
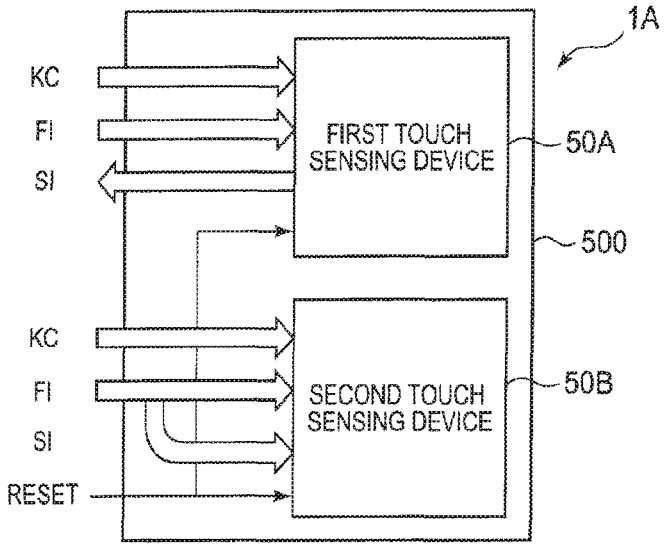
FIG. 11 is a block diagram showing connections with a first touch sensing device and a second touch sensing device in a touch sensing unit in accordance with a first application example of the embodiment of the present invention.

FIG. 11 is a block diagram showing connections with the first touch sensing device 50A and the second touch sensing device 50B in a touch sensing unit 500 according to the first application example of the embodiment of the present invention.

In FIG. 11, KC represents common side switch inputs, FI represents signals outputted from first contacts of the key switch matrix, and SI represents signals outputted from second contacts of the key switch matrix.

In the touch sensing unit 500, similarly to the touch sensing device 50 of the embodiment described above, the first touch sensing device 50A measures velocity values on the basis of FI and SI, counts correction durations for matching sound emission timings with key press operations, generates sound emission information, and sends the sound emission information to the CPU 11. In the second touch sensing device 50B, the terminals FI and SI are short-circuited, and the second touch sensing device 50B is connected to the third contact and receives signals outputted from the third contact.

Figure 12:
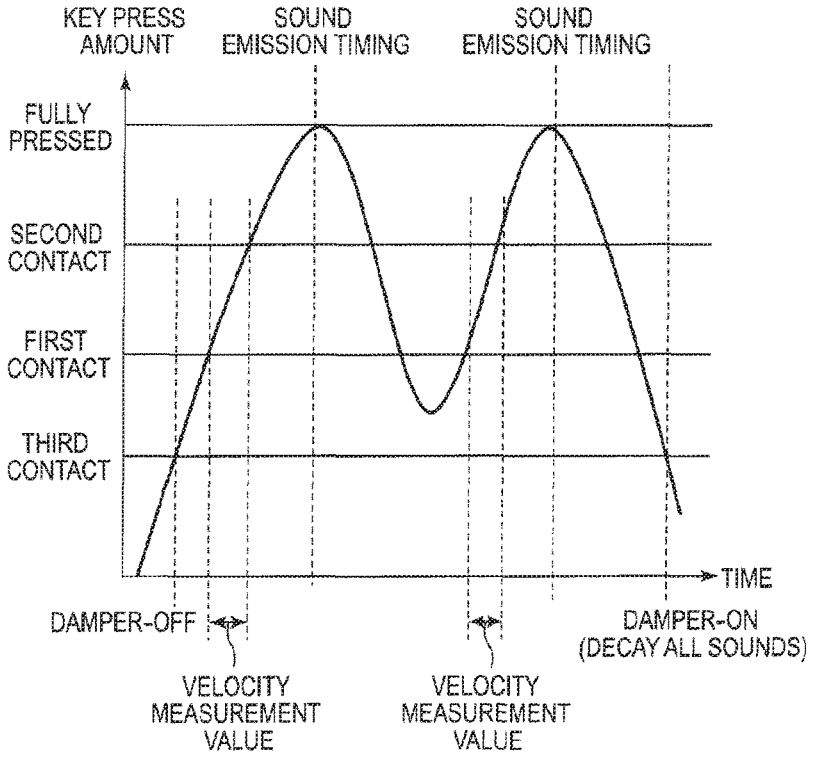
FIG. 12 is a graph describing timings of sound emission and sound decay in an electronic musical instrument employing the touch sensing unit in accordance with the first application example of the embodiment of the present invention.

FIG. 12 is a diagram describing sound emission and decay timings in the electronic musical instrument 1A employing the touch sensing unit 500 according to the first application example of the embodiment of the present invention.

As illustrated in FIG. 12, when the second touch sensing device 50B receives a signal outputted from the third contact, the electronic musical instrument 1A turns the damper off. The first touch sensing device 50A measures the velocity value and counts the correction duration, and the electronic musical instrument 1A emits a sound at the timing at which the key is fully pressed. Then, as shown in FIG. 12, when first contacts and second contacts are repeatedly closed and opened, sounds are emitted at timings at which the respective keys are fully pressed. Because the damper is turned off, these sounds do not decay and sounds are continuously emitted. When the second touch sensing device 50B again receives a signal outputted from the third contact, the electronic musical instrument 1A turns the damper on, and all sounds decay.

Thus, the touch sensing unit 500 is equipped with the first touch sensing device 50A and the second touch sensing device 50B.

The first touch sensing device 50A generates sound emission information and sends the sound emission information to the CPU 11 acting as the sound emission controller.

The second touch sensing device 50B is disconnected from the first contacts and second contacts, short-circuits the first contacts and second contacts, and is connected with the third contact.

Thus, if, for example, the third contact is a switch turning a damper on and off, the damper may be turned on and off in an electronic musical instrument that may emit sounds at accurate timings corresponding to presses of keys even when many sounds are being generated at the same time.

Next, the second application example is described.

An electronic musical instrument 1B of the second application example measures release velocity values with a touch sensing unit 501, and decays the sounds that are emitted at suitable timings on the basis of the release velocity values.

Figure 13:
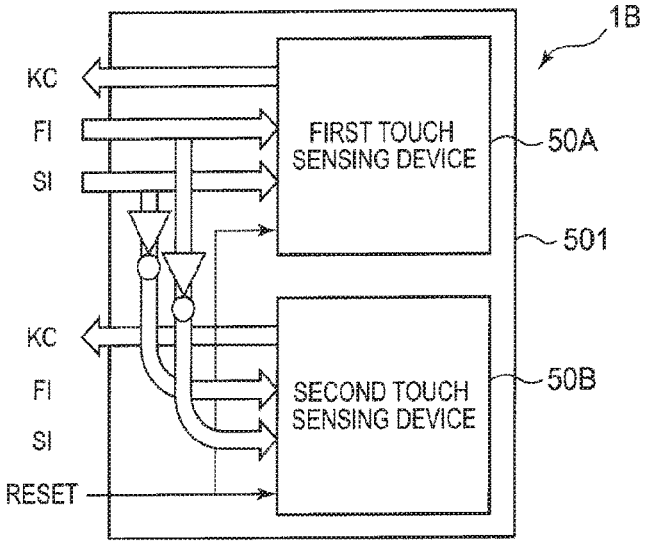
FIG. 13 is a block diagram showing connections with a first touch sensing device and a second touch sensing device in a touch sensing unit in accordance with a second application example of the embodiment of the present invention.

FIG. 13 is a block diagram showing connections with the first touch sensing device 50A and the second touch sensing device 50B in the touch sensing unit 501 according to the second application example of the embodiment of the present invention.

In FIG. 13, KC represents common side switch inputs, FI represents signals outputted from the first contacts of the key switch matrix, and SI represents signals outputted from the second contacts of the key switch matrix.

In the touch sensing unit 501, similarly to the touch sensing device 50 of the embodiment described above, the first touch sensing device 50A measures velocity values on the basis of FI and SI and counts correction durations to match sound emission timings with key press operations. The second touch sensing device 50B measures release velocity values on the basis of inverted FI signals and inverted SI signals, and counts correction durations on the basis of the release velocity values in order to match sound decay timings with key release operations. After a correction duration has passed, the second touch sensing device 50B sends sound decay information to the CPU 11 acting as the sound emission controller. When the CPU 11 acting as the sound emission controller receives the sound decay information, the CPU 11 controls the decay of a sound that has been emitted.

Figure 14:
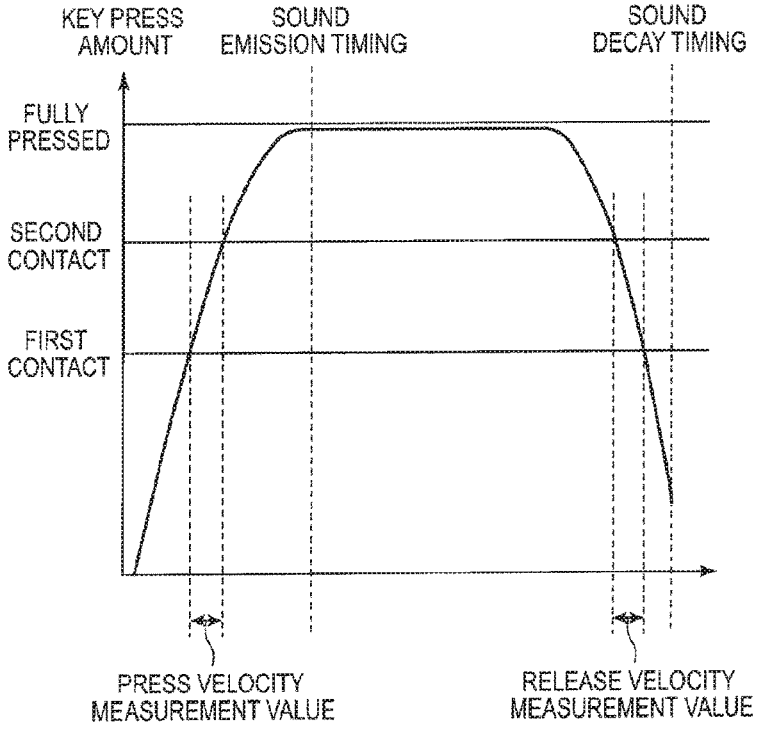
FIG. 14 is a graph describing timings of sound emission and sound decay in an electronic musical instrument employing the touch sensing unit in accordance with the second application example of the embodiment of the present invention.

FIG. 14 is a graph describing sound emission timings of sound emission and sound decay in the electronic musical instrument 1B employing the touch sensing unit 501 according to the second application example of the embodiment of the present invention.

As shown in FIG. 14, the electronic musical instrument 1B measures a velocity value with the first touch sensing device 50A, counts a correction duration, and emits a sound at a timing at which that key is fully pressed. Then, the electronic musical instrument 1B measures a release velocity value with the second touch sensing device 50B, counts a correction duration, and decays the sound at a suitable timing Corresponding with the key release operation.

Thus, the touch sensing unit 501 is equipped with the first touch sensing device 50A and the second touch sensing device 50B.

The first touch sensing device 50A generates sound emission information and sends the sound emission information to the CPU 11 acting as the sound emission controller.

The second touch sensing device 50B generates sound decay information on the basis of signals that are respectively inverted signals from the first contacts and second contacts, and sends the sound decay information to the CPU 11 acting as the sound emission controller.

Thus, in an electronic musical instrument that may emit sounds at accurate timings corresponding to presses of keys, the sounds may be decayed at accurate timings corresponding to releases of the keys even when many sounds are being generated at the same time.

Next, the third application example is described.

An electronic musical instrument 1C of the third application example is equipped with a touch sensing unit 502.

Figure 15:
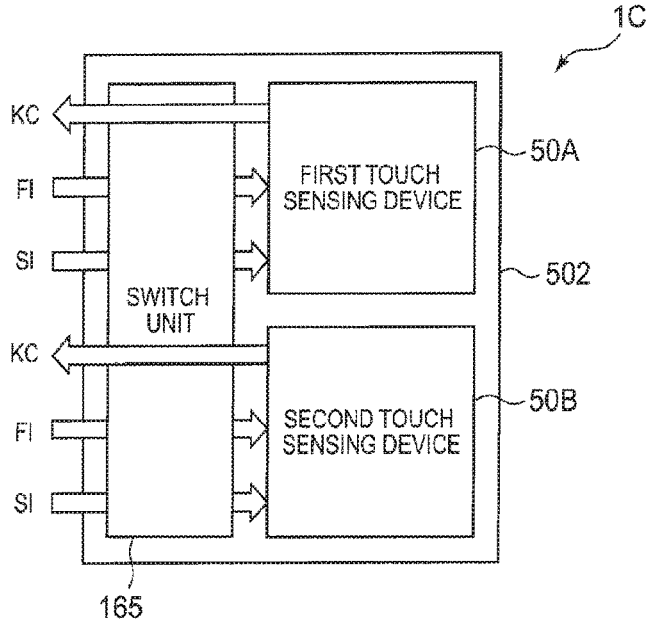
FIG. 15 is a block diagram showing connections with a first touch sensing device and a second touch sensing device in a touch sensing unit in accordance with a third application example of the embodiment of the present invention.

FIG. 15 is a block diagram showing connections with the first touch sensing device 50A and the second touch sensing device 50B in the touch sensing unit 502 according to the third application example of the embodiment of the present invention.

The touch sensing unit 502 is equipped with the first touch sensing device 50A, the second touch sensing device 50B, and a switch unit 165. The switch unit 165 is controlled by the CPU 11 of the electronic musical instrument 1C (see FIG. 1) and suitably switches connections between four contacts, including the aforementioned first contact and second contact that are successively closed in accordance with a key press operation, and the first touch sensing device 50A and second touch sensing device 50B.

Figure 16:
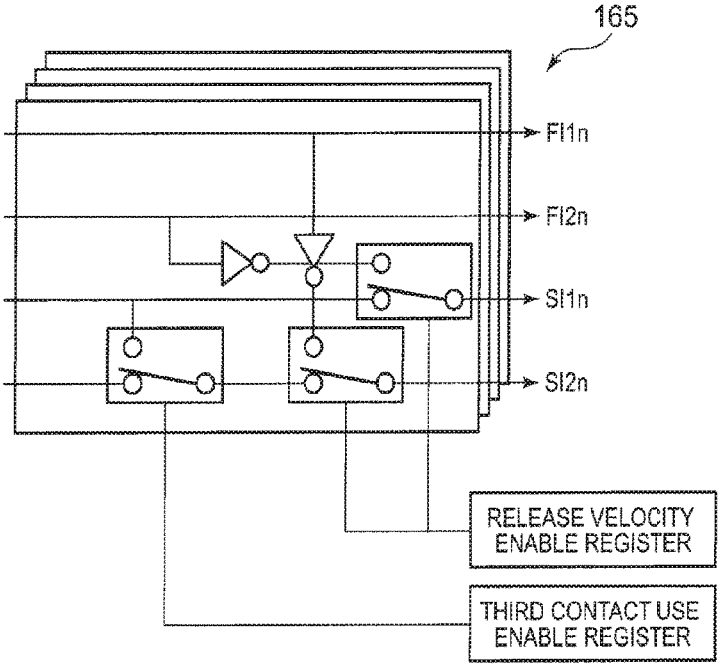
FIG. 16 is a circuit diagram showing the structure of a switching unit in accordance with the third application example of the embodiment of the present invention.

FIG. 16 is a circuit diagram showing structures of the switch unit 165 according to the third application example of the embodiment of the present invention.

The switch unit 165 is controlled by the CPU 11, and switches circuit paths so as to send signals from any two contacts of the up to four contacts to the first touch sensing device 50A and send signals from the other two contacts to the second touch sensing device 50B. The combination of two signals from the contacts that is sent to the first touch sensing device 50A or the second touch sensing device 50B is determined by control by the CPU 11. As in, for example, the electronic musical instrument 1A of the first application example, the switch unit 165 may, by short-circuiting a circuit path, send signals from two contacts to the first touch sensing device 50A and send signals from one contact to the second touch sensing device 30B.

Figure 17:
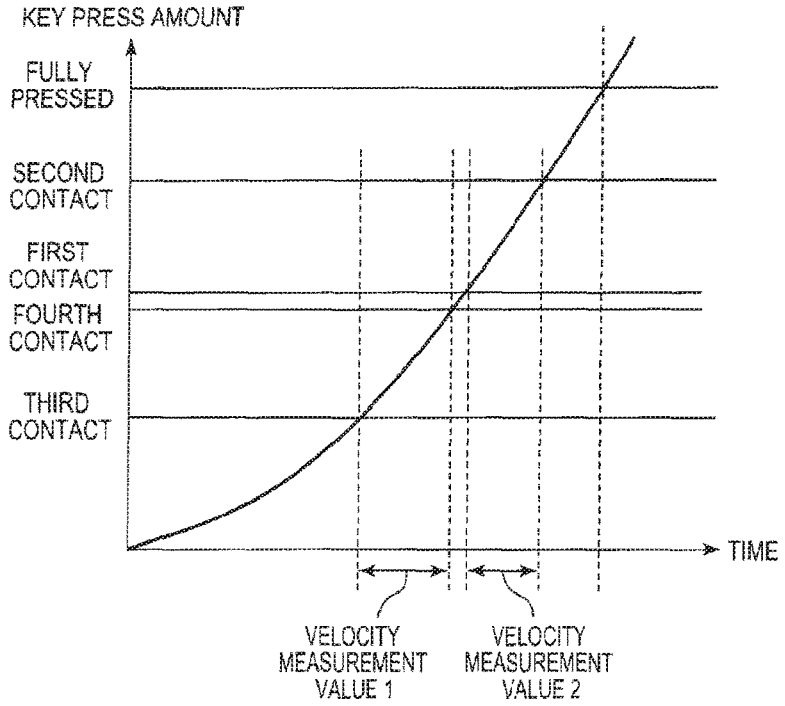
FIG. 17 is a graph describing an example of a sound emission and sound decay timing in an electronic musical instrument employing the touch sensing unit in accordance with the third application example of the embodiment of the present invention.
Figure 18:
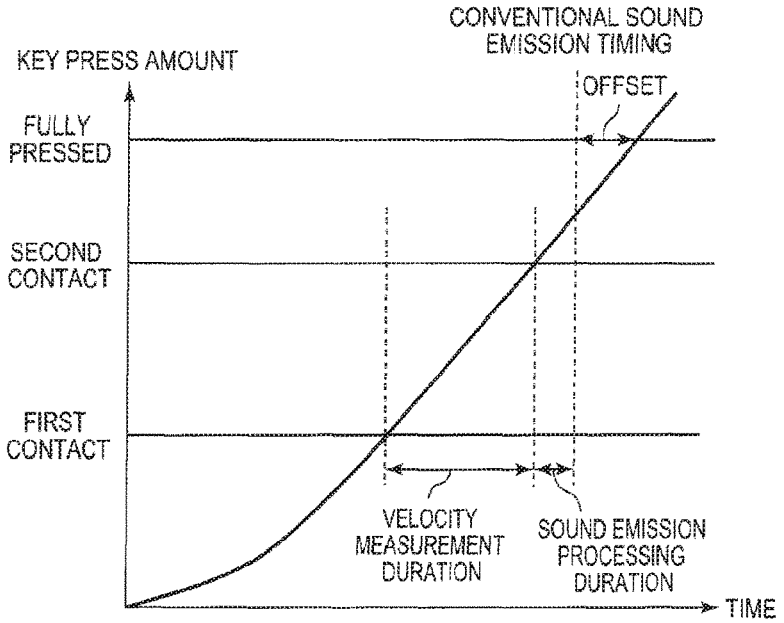
FIG. 18 is a graph describing timings from when a key is pressed until a sound is emitted in a conventional electronic piano.
Figure 19:
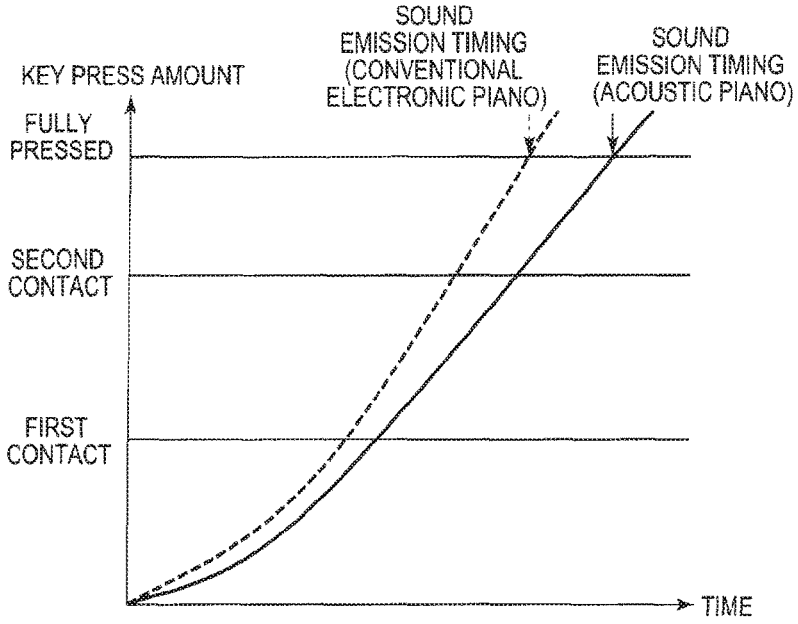
FIG. 19 is a graph describing the difference between sound emission timings in a conventional electronic piano and sound emission timings in an acoustic piano.
Figure 20:
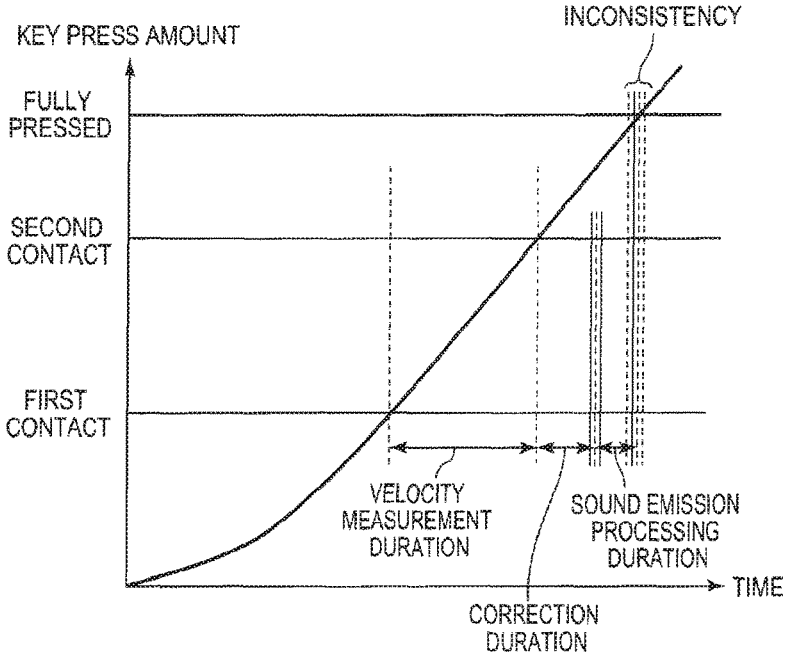
FIG. 20 is a graph describing timings from when a key is pressed until a sound is emitted in a conventional electronic piano in which a sound emission timing is delayed by processing in software.

FIG. 17 is a graph describing an example of a sound emission and sound decay timing in the electronic musical instrument 10 employing the touch sensing unit 502 according to the third application example of the embodiment of the present invention.

In the example shown in FIG. 17, the switch unit 165 connects a third contact and a fourth contact with the first touch sensing device 50A, and connects the first contact and second contact with the second touch sensing device 50B. Accordingly, the electronic musical instrument 10 measures a velocity measurement value 1 with the first touch sensing device 50A and measures a velocity measurement value 2 with the second touch sensing device 50B, calculates a velocity value from the velocity measurement value 1 and the velocity measurement value 2, counts a correction duration, and emits a sound at a timing at which that key is fully pressed.

Thus, the touch sensing unit 502 is equipped with the first touch sensing device 50A, the second touch sensing device 50B and the switch unit 165.

The switch unit 165 switches connections between the first touch sensing device 50A and second touch sensing device 50B and the four contacts including the first contact and second contact.

Thus, in an electronic musical instrument that may emit sounds at accurate timings corresponding to presses of keys even when many sounds are being generated at the same time, with a single hardware structure: a damper may be turned on and off as in the electronic musical instrument 1A according to the first application example; sounds may be decayed at accurate timings corresponding to releases of keys as in the electronic musical instrument 1B according to the second application example; and, as illustrated in FIG. 17, a velocity value may be calculated from plural velocity measurement values.

It should be noted that the present invention is not limited to the embodiment described above, and any modifications and improvements thereto within a scope that can realize the object of the present invention are included in the present invention.

For example, in the embodiment described above, the number of keys is 88 and 88 particular addresses are provided in the counter memory, but this is not a limitation. For example, an arbitrary number of particular addresses may be provided in the counter memory provided the number is not less than a number of keys.

In the embodiment described above, the counter memory and the attainment duration memory are separately provided, but this is not a limitation. For example, a single memory including the counter memory and the attainment duration memory may be provided.

In the application examples of the embodiment described above, two touch sensing devices with the same structure are used in a touch sensing unit, but this is not a limitation. For example if an attainment duration value used by the comparison circuit of one of the touch sensing devices is a constant, the attainment duration memory need not be provided therein.

In the embodiment described above, an example is described in which the electronic musical instrument employing the touch sensitive device according to the present invention is an electronic piano, but this is not a particular limitation.

For example, the present invention may be generally applied to electronic devices with touch sensing functions. Specifically, the present invention is applicable to, for example, notebook computers, printers, television sets, video cameras, portable navigation devices, portable telephones, portable video game machines and so forth.

In other words, the hardware configuration shown in FIG. 1 is merely an illustrative example, and is not a particular limitation.

A number of embodiments of the present invention are explained hereabove. These embodiments are merely examples and do not limit the technical scope of the invention. The present invention may be attained by numerous other embodiments, and numerous modifications such as omissions, substitutions and the like are possible within a technical scope not departing from the spirit of the invention. These embodiments and modifications are to be encompassed by the scope and gist of the invention recited in the present specification, etc., and are encompassed by the inventions recited in the attached claims and their equivalents.

What is claimed is:

1. A touch sensing device comprising:

a first contact and second contact provided at each of a plurality of keys, the first contact and second contact being successively closable in accordance with a key press operation;

a reception section that receives closed sense signals from the first contact and the second contact;

a first counter that, based on the respective closed sense signals received from the first contact and the second contact, counts a first count value that indicates a duration from when the first contact is closed until the second contact is closed;

a second counter that counts a second count value that indicates a duration after the counting of the first count value ends;

a comparator that compares the second count value with a pre-specified attainment duration value and, [when] *in response to* a result of the comparison [satisfies] *satisfying* a predetermined condition, outputs a control signal; and a controller that, [when it receives] *in response to* the control signal from the comparator, sends sound emission information instructing an emission of sound [by a sound emission controller], the sound emission information including touch information based on the first count value, wherein, [when] *in response to matching between* the attainment duration value and the second count value [match], the comparator sends a match signal that serves as the control signal.

2. The touch sensing device according to claim 1, further comprising:

a memory comprising addresses respectively corresponding to the plurality of keys, wherein a region of the memory designated by each address stores the first count value and the second count value.

3. The touch sensing device according to claim 1, further comprising:

an attainment duration memory that stores attainment duration values that represent, in accordance with the first count value, a pre-specified duration for completion of counting by the second counter, wherein the comparator compares an attainment duration value stored in the attainment duration memory with the second count value.

4. A touch sensing unit comprising [first and second of the touch sensing devices] *a first touch sensing device and a second touch sensing device, each of the touch sensing devices comprising the touch sensing device* according to claim 1, wherein:

the first touch sensing device generates and sends the sound emission information, and the second touch sensing device is disconnected from at least one of the first contact and the second contact, and is connected with a third contact provided at an electronic musical instrument.

5. A touch sensing unit comprising [first and second of the touch sensing devices] *a first touch sensing device and a second touch sensing device, each of the touch sensing devices comprising the touch sensing device* according to claim 1, wherein:

the first touch sensing device generates the sound emission information and sends the sound emission information, and the second touch sensing device generates sound decay information based on respectively inverted signals from at least one of the first contact and the second contact, and sends the sound decay information.

6. A touch sensing unit comprising two [of the] touch sensing devices, *each of the two touch sensing devices comprising the touch sensing device* according to claim 1; and a switch unit that switches connections between the two touch sensing devices and four contacts provided at an electronic musical instrument, which include the first contact and the second contact.

7. A touch sensing method comprising:

receiving closed sense signals from a first contact and second contact provided at each of a plurality of keys, the first contact and second contact successively being closed in accordance with a key press operation;

counting, based on the respective closed sense signals received from the first contact and the second contact, a first count value that indicates a duration from when the first contact is closed until the second contact is closed;

counting a second count value that indicates a duration after the counting of the first count value ends;

comparing the second count value with a pre-specified attainment duration value and, [when] *in response to* a result of the comparison [satisfies] *satisfying* a predetermined condition, outputting a control signal; and

[when] *in response to* the control signal [is received], sending sound emission information instructing an emission of sound [by a sound emission controller], the sound emission information including touch information based on the first count value;

wherein [when] *in response to matching between* the attainment duration value and the second count value [match], a match signal is sent that serves as the control signal.

8. The touch sensing method according to claim 7, further comprising:

accessing a memory having addresses respectively corresponding to the plurality of keys; and storing the first count value and the second count value in a region of the memory designated by each address.

9. A non-transitory computer readable storage medium having stored therein a program executable by a computer that controls the computer to execute operations comprising:

receiving closed sense signals from a first contact and second contact provided at each of a plurality of keys, the first contact and second contact successively being closed in accordance with a key press operation;

counting, based on the respective closed sense signals received from the first contact and the second contact, a first count value that indicates a duration from when the first contact is closed until the second contact is closed;

counting a second count value that indicates a duration after the counting of the first count value ends;

comparing the second count value with a pre-specified attainment duration value and, [when] *in response to* a result of the comparison [satisfies] *satisfying* a predetermined condition, outputting a control signal; and

[when] *in response to* the control signal [is received], sending sound emission information instructing an emission of sound [by a sound emission controller], the sound emission information including touch information based on the first count value;

wherein [when] *in response to matching between* the attainment duration value and the second count value [match], a match signal is sent that serves as the control signal.

10. The storage medium according to claim 9, wherein the program controls the computer to execute further operations comprising:

accessing a memory having addresses respectively corresponding to the plurality of keys; and storing the first count value and the second count value in a region of the memory designated by each address.

11. A touch sensing device comprising:

a first contact and second contact provided at each of a plurality of keys, the first contact and second contact being successively closable in accordance with a key press operation;

a reception section that receives closed sense signals from the first contact and the second contact;

a first counter that, based on the respective closed sense signals received from the first contact and the second contact, counts a first count value that indicates a duration from when the first contact is closed until the second contact is closed;

a second counter that counts a second count value that indicates a duration after the counting of the first count value ends;

a comparator that compares the second count value with a pre-specified attainment duration value and, [when] *in response to* a result of the comparison [satisfies] *satisfying* a predetermined condition, outputs a control signal;

a controller that, [when it receives] *in response to* the control signal from the comparator, sends sound emission information instructing an emission of sound [by a sound emission controller], the sound emission information including touch information based on the first count value; and an attainment duration memory that stores attainment duration values that represent, in accordance with the first count value, a pre-specified duration for completion of counting by the second counter;

wherein the comparator compares an attainment duration value stored in the attainment duration memory with the second count value.

12. A touch sensing unit comprising first and second touch sensing devices, wherein each of the first and second touch sensing devices comprises:

a first contact and second contact provided at each of a plurality of keys, the first contact and second contact being successively closable in accordance with a key press operation;

a reception section that receives closed sense signals from the first contact and the second contact;

a first counter that, based on the respective closed sense signals received from the first contact and the second contact, counts a first count value that indicates a duration from when the first contact is closed until the second contact is closed;

a second counter that counts a second count value that indicates a duration after the counting of the first count value ends;

a comparator that compares the second count value with a pre-specified attainment duration value and, [when] *in response to* a result of the comparison [satisfies] *satisfying* a predetermined condition, outputs a control signal; and a controller that, [when it receives] *in response to* the control signal from the comparator, sends sound emission information instructing an emission of sound [by a sound emission controller], the sound emission information including touch information based on the first count value;

wherein the first touch sensing device generates and sends the sound emission information; and wherein the second touch sensing device is disconnected from at least one of the first contact and the second contact, and is connected with a third contact provided at an electronic musical instrument.

13. A touch sensing unit comprising first and second touch sensing devices, wherein each of the first and second touch sensing devices comprises:

a first contact and second contact provided at each of a plurality of keys, the first contact and second contact being successively closable in accordance with a key press operation;

a reception section that receives closed sense signals from the first contact and the second contact;

a first counter that, based on the respective closed sense signals received from the first contact and the second contact, counts a first count value that indicates a duration from when the first contact is closed until the second contact is closed;

a second counter that counts a second count value that indicates a duration after the counting of the first count value ends;

a comparator that compares the second count value with a pre-specified attainment duration value and, [when] *in response to* a result of the comparison [satisfies] *satisfying* a predetermined condition, outputs a control signal; and a controller that, [when it receives] *in response to* the control signal from the comparator, sends sound emission information instructing an emission of sound [by a sound emission controller], the sound emission information including touch information based on the first count value;

wherein the first touch sensing device generates the sound emission information and sends the sound emission information; and wherein the second touch sensing device generates sound decay information based on respectively inverted signals from at least one of the first contact and the second contact, and sends the sound decay information.

14. A touch sensing unit comprising two touch sensing devices, wherein each of the touch sensing devices comprises:

a first contact and second contact provided at each of a plurality of keys, the first contact and second contact being successively closable in accordance with a key press operation;

a reception section that receives closed sense signals from the first contact and the second contact;

a first counter that, based on the respective closed sense signals received from the first contact and the second contact, counts a first count value that indicates a duration from when the first contact is closed until the second contact is closed;

a second counter that counts a second count value that indicates a duration after the counting of the first count value ends;

a comparator that compares the second count value with a pre-specified attainment duration value and, [when] *in response to* a result of the comparison [satisfies] *satisfying* a predetermined condition, outputs a control signal;

a controller that, [when it receives] *in response to* the control signal from the comparator, sends sound emission information instructing an emission of sound [by a sound emission controller], the sound emission information including touch information based on the first count value; and a switch unit that switches connections between the two touch sensing devices and four contacts provided at an electronic musical instrument, which include the first contact and the second contact.

15. The touch sensing device according to claim 11, wherein [when] *in response to matching between* the attainment duration value and the second count value [match], the comparator sends a match signal that serves as the control signal.

16. The touch sensing unit according to claim 12, wherein, in each of the first and second touch sensing devices, [when] *in response to matching between* the attainment duration value and the second count value [match], the comparator sends a match signal that serves as the control signal.

17. The touch sensing unit according to claim 13, wherein, in each of the first and second touch sensing devices, [when] *in response to matching between* the attainment duration value and the second count value [match], the comparator sends a match signal that serves as the control signal.

18. The touch sensing unit according to claim 14, wherein, in each of the two touch sensing devices, [when] *in*

*response to matching between* the attainment duration value and the second count value [match], the comparator sends a match signal that serves as the control signal.

*19. An electronic musical instrument comprising:*

*a touch sensing device;*

*a plurality of keys; and*

*an output section that includes a speaker,*

*wherein the touch sensing device includes:*

*a first contact and second contact provided at each of the plurality of keys, the first contact and second contact being successively closable in accordance with a key press operation;*

*a reception section that receives closed sense signals from the first contact and the second contact;*

*a first counter that, based on the respective closed sense signals received from the first contact and the second contact, counts a first count value that indicates a duration from when the first contact is closed until the second contact is closed;*

*a second counter that counts a second count value that indicates a duration after the counting of the first count value ends;*

*a comparator that compares the second count value with a pre-specified attainment duration value and, in response to a result of the comparison satisfying a predetermined condition, outputs a control signal; and*

*a controller that, in response to the control signal from the comparator, sends sound emission information instructing an emission of sound, the sound emission information including touch information based on the first count value,*

*wherein, in response to matching between the attainment duration value and the second count value, the comparator sends a match signal that serves as the control signal.*

*20. The electronic musical instrument according to claim 19, wherein the output section further includes at least one of a display and a digital-to-analog conversion circuit.*

*21. An electronic musical instrument comprising:*

*a touch sensing device;*

*a plurality of keys; and*

*an output section that includes a speaker,*

*wherein the touch sensing device includes:*

*a first contact and second contact provided at each of the plurality of keys, the first contact and second contact being successively closable in accordance with a key press operation;*

*a reception section that receives closed sense signals from the first contact and the second contact;*

*a first counter that, based on the respective closed sense signals received from the first contact and the second contact, counts a first count value that indicates a duration from when the first contact is closed until the second contact is closed;*

*a second counter that counts a second count value that indicates a duration after the counting of the first count value ends;*

*a comparator that compares the second count value with a pre-specified attainment duration value and, in response to a result of the comparison satisfying a predetermined condition, outputs a control signal;*

*a controller that, in response to the control signal from the comparator, sends sound emission information instructing an emission of sound, the sound emission information including touch information based on the first count value; and*

*an attainment duration memory that stores attainment duration values that represent, in accordance with the first count value, a pre-specified duration for completion of counting by the second counter;*

*wherein the comparator compares an attainment duration value stored in the attainment duration memory with the second count value.*

*22. The electronic musical instrument according to claim 21, wherein the output section further includes at least one of a display and a digital-to-analog conversion circuit.*

*23. The electronic musical instrument according to claim 21, wherein in response to matching between the attainment duration value and the second count value, the comparator sends a match signal that serves as the control signal.*

*24. An electronic musical instrument comprising:*

*a touch sensing unit;*

*a plurality of keys; and*

*an output section that includes a speaker,*

*wherein the touch sensing unit includes first and second touch sensing devices,*

*wherein each of the first and second touch sensing devices comprises:*

*a first contact and second contact provided at each of the plurality of keys, the first contact and second contact being successively closable in accordance with a key press operation;*

*a reception section that receives closed sense signals from the first contact and the second contact;*

*a first counter that, based on the respective closed sense signals received from the first contact and the second contact, counts a first count value that indicates a duration from when the first contact is closed until the second contact is closed;*

*a second counter that counts a second count value that indicates a duration after the counting of the first count value ends;*

*a comparator that compares the second count value with a pre-specified attainment duration value and, in response to a result of the comparison satisfying a predetermined condition, outputs a control signal; and*

*a controller that, in response to the control signal from the comparator, sends sound emission information instructing an emission of sound, the sound emission information including touch information based on the first count value;*

*wherein the first touch sensing device generates and sends the sound emission information; and*

*wherein the second touch sensing device is disconnected from at least one of the first contact and the second contact, and is connected with a third contact provided at the electronic musical instrument.*

*25. The electronic musical instrument according to claim 24, wherein the output section further includes at least one of a display and a digital-to-analog conversion circuit.*

*26. The touch sensing unit according to claim 24, wherein, in each of the first and second touch sensing devices, in response to matching between the attainment duration value and the second count value, the comparator sends a match signal that serves as the control signal.*

*27. An electronic musical instrument comprising:*

*a touch sensing unit;*

*a plurality of keys; and*

*an output section that includes a speaker,*

*wherein the touch sensing unit comprising first and second touch sensing devices,*

*wherein each of the first and second touch sensing devices comprises:*

*a first contact and second contact provided at each of the plurality of keys, the first contact and second contact being successively closable in accordance with a key press operation;*

*a reception section that receives closed sense signals from the first contact and the second contact;*

*a first counter that, based on the respective closed sense signals received from the first contact and the second contact, counts a first count value that indicates a duration from when the first contact is closed until the second contact is closed;*

*a second counter that counts a second count value that indicates a duration after the counting of the first count value ends;*

*a comparator that compares the second count value with a pre-specified attainment duration value and, in response to a result of the comparison satisfying a predetermined condition, outputs a control signal; and*

*a controller that, in response to the control signal from the comparator, sends sound emission information instructing an emission of sound, the sound emission information including touch information based on the first count value;*

*wherein the first touch sensing device generates the sound emission information and sends the sound emission information; and*

*wherein the second touch sensing device generates sound decay information based on respectively inverted signals from at least one of the first contact and the second contact, and sends the sound decay information.*

*28. The electronic musical instrument according to claim 27, wherein the output section further includes at least one of a display and a digital-to-analog conversion circuit.*

*29. The electronic musical instrument according to claim 27, wherein, in each of the first and second touch sensing devices, in response to matching between the attainment duration value and the second count value, the comparator sends a match signal that serves as the control signal.*

*30. An electronic musical instrument comprising:*

*a touch sensing unit;*

*a plurality of keys; and*

*an output section that includes a speaker,*

*wherein the touch sensing unit comprising two touch sensing devices, wherein each of the touch sensing devices comprises:*

*a first contact and second contact provided at each of the plurality of keys, the first contact and second contact being successively closable in accordance with a key press operation;*

*a reception section that receives closed sense signals from the first contact and the second contact;*

*a first counter that, based on the respective closed sense signals received from the first contact and the second contact, counts a first count value that indicates a duration from when the first contact is closed until the second contact is closed;*

*a second counter that counts a second count value that indicates a duration after the counting of the first count value ends;*

*a comparator that compares the second count value with a pre-specified attainment duration value and, in response to a result of the comparison satisfying a predetermined condition, outputs a control signal;*

*a controller that, in response to the control signal from the comparator, sends sound emission information instructing an emission of sound, the sound emission information including touch information based on the first count value; and*

*a switch unit that switches connections between the two touch sensing devices and four contacts provided at the electronic musical instrument, which include the first contact and the second contact.*

*31. The electronic musical instrument according to claim 30, wherein the output section further includes at least one of a display and a digital-to-analog conversion circuit.*

*32. The electronic musical instrument according to claim 30, wherein, in each of the two touch sensing devices, in response to matching between the attainment duration value and the second count value, the comparator sends a match signal that serves as the control signal.*

* * * * *